United States Patent
Shirai et al.

(10) Patent No.: US 11,031,841 B2
(45) Date of Patent: Jun. 8, 2021

(54) ELECTRIC ACTUATOR

(71) Applicant: NIDEC TOSOK CORPORATION, Kanagawa (JP)

(72) Inventors: Hiroshi Shirai, Kanagawa (JP); Shuichi Kinjo, Kanagawa (JP); Tomoki Sato, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 132 days.

(21) Appl. No.: 16/581,757

(22) Filed: Sep. 25, 2019

(65) Prior Publication Data

US 2020/0106335 A1 Apr. 2, 2020

(30) Foreign Application Priority Data

Sep. 27, 2018 (JP) .............................. JP2018-181601

(51) Int. Cl.
| | |
|---|---|
| *H02K 7/08* | (2006.01) |
| *H02K 7/075* | (2006.01) |
| *H02K 7/116* | (2006.01) |
| *F16H 37/12* | (2006.01) |
| *F16H 57/02* | (2012.01) |

(52) U.S. Cl.
CPC .......... *H02K 7/075* (2013.01); *F16H 37/122* (2013.01); *H02K 7/08* (2013.01); *H02K 7/116* (2013.01); *F16H 2057/02073* (2013.01); *H02K 2201/03* (2013.01)

(58) Field of Classification Search
CPC .......... H02K 7/075; H02K 7/08; H02K 7/116; H02K 2201/03; F16H 37/122; F16H 2057/02073
USPC ............................................................ 310/20
See application file for complete search history.

(56) References Cited

FOREIGN PATENT DOCUMENTS

JP 2016-109226 6/2016

*Primary Examiner* — Terrance L Kenerly
(74) *Attorney, Agent, or Firm* — JCIPRNET

(57) ABSTRACT

An electric actuator includes a motor, a speed reduction mechanism, a first bearing, and a bearing holder. The speed reduction mechanism has external and internal gears, an output flange that is positioned at one side in an axial direction from the external gear, and a plurality of projecting portions that project in the axial direction from one of the output flange and the external gear toward the other. The plurality of projecting portions are inserted into a plurality of first bore portions disposed along a circumferential direction, respectively. The bearing holder has a cylindrical circumferential wall positioned at an outer side in a radial direction of the first bearing and a support wall supporting the first bearing from the other side in the axial direction. A position adjustment mechanism configured to be capable of moving the support wall in the axial direction is arranged in the bearing holder.

6 Claims, 7 Drawing Sheets

ELECTRIC ACTUATOR

CROSS-REFERENCE TO RELATED APPLICATION

This application claims the priority of Japan patent application serial no. 2018-181601, filed on Sep. 27, 2018. The entirety of the above-mentioned patent application is hereby incorporated by reference herein and made a part of this specification.

BACKGROUND

Technical Field

The disclosure relates to an electric actuator.

Related Art

An electric actuator including a speed reducer is known. For example, Patent literature 1 discloses a speed reducer including a sun gear arranged at an outer circumference of an eccentric portion of an input shaft via a bearing and a ring gear intermeshing with the sun gear. In the speed reducer, a projecting portion which projects from the sun gear in an axial direction enters a bore portion arranged in the output shaft. Consequently, a rotational drive force is transmitted from the sun gear to the output shaft via the projecting portion and the bore portion.

LITERATURE OF RELATED ART

Patent Literature

[Patent literature 1] Japanese Laid-Open Publication No. 2016-109226

In the above-described electric actuator, a wave washer supporting a bearing which supports the input shaft may be arranged. In this case, the wave washer can absorb an assembly error of the bearing in the axial direction. However, on the other hand, the wave washer is elastically and compressively deformed, and thereby the input shaft significantly moves together with the bearing, in some cases. Consequently, relative positions of the sun gear and the output shaft are displaced in the axial direction, and there is a concern that a problem of the projecting portion falling or the like out of the bore portion arises.

SUMMARY

An aspect of an electric actuator of the disclosure includes: a motor that has a motor shaft rotating around a central axis, a rotor body fixed to the motor shaft, and a stator facing the rotor body via a gap in a radial direction; a speed reduction mechanism that is coupled to a region of the motor shaft at one side in an axial direction of the motor shaft; a case that has a case wall covering the stator at the other side in the axial direction of the motor shaft and accommodates the motor and the speed reduction mechanism; an output shaft which extends in the axial direction of the motor shaft at the one side of the motor shaft in the axial direction and to which rotation of the motor shaft is transmitted via the speed reduction mechanism; a first bearing that is fixed to the motor shaft and supports the motor shaft rotatably; a second bearing that is fixed to the motor shaft; and a bearing holder that is arranged at the case wall and holds the first bearing. The motor shaft has an eccentric shaft portion having an eccentric axis eccentric with respect to the central axis and treats the eccentric axis as a center. The speed reduction mechanism has an external gear that is coupled to the eccentric shaft portion via the second bearing, an internal gear that surrounds an outer side of the external gear in the radial direction so as to be fixed to the case and intermeshes with the external gear, an output flange that expands outward in the radial direction from the output shaft and is positioned at one side in the axial direction of the external gear, and a plurality of projecting portions that project in the axial direction from one of the output flange and the external gear toward the other and are disposed along a circumferential direction. The other of the output flange and the external gear has a plurality of first bore portions disposed along the circumferential direction. The first bore portion has an inner diameter larger than an outer diameter of the projecting portion. The plurality of projecting portions are inserted into the plurality of first bore portions, respectively, and support the external gear via an inner surface of the first bore hole in an oscillatory manner around the central axis. The bearing holder has a cylindrical circumferential wall that is positioned at an outer side in a radial direction of the first bearing and a support wall that supports the first bearing from the other side in the axial direction. A position adjustment mechanism configured to be capable of moving the support wall in the axial direction is arranged in the bearing holder.

DESCRIPTION OF THE EMBODIMENTS

Figure 1:
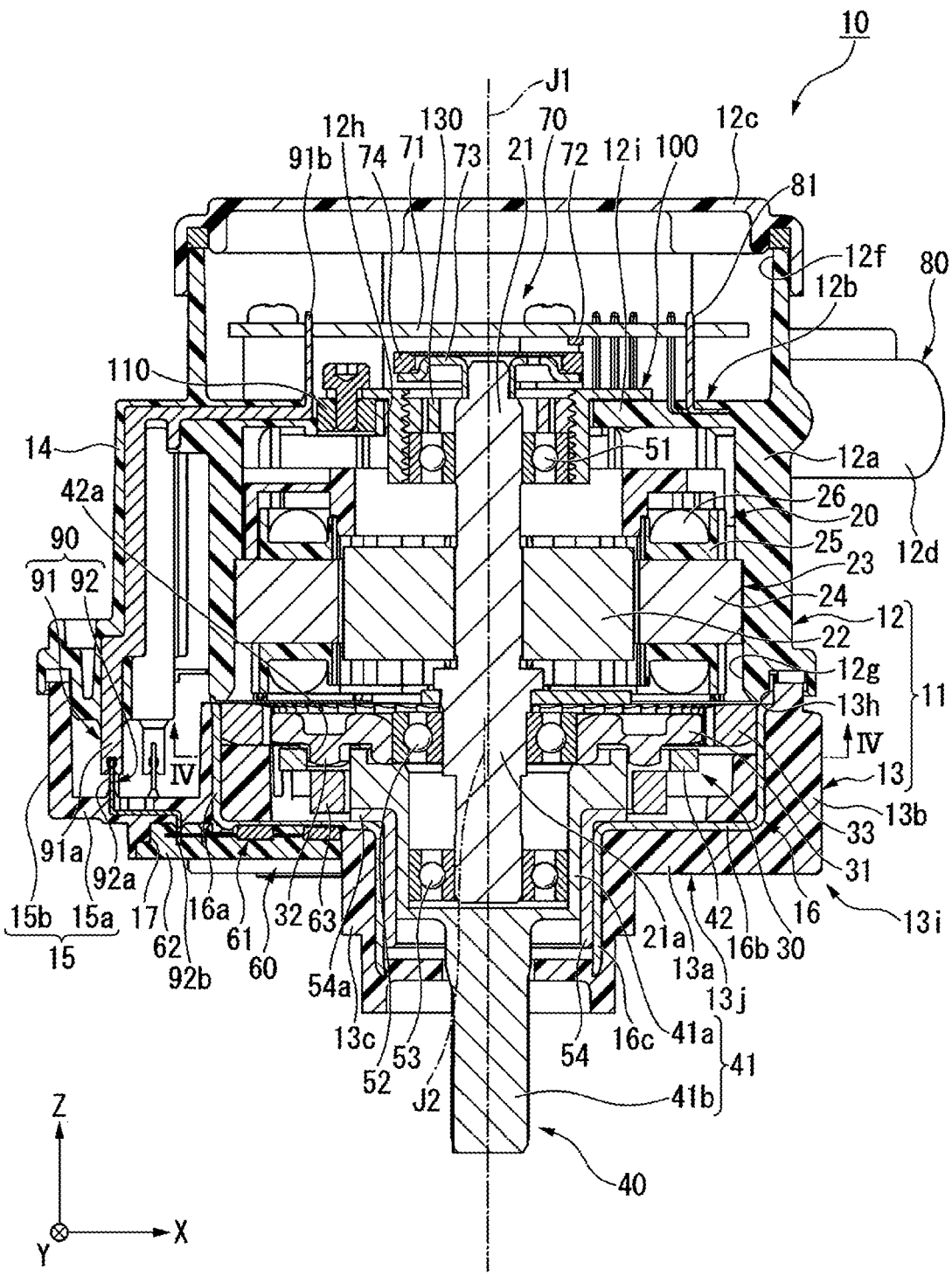
FIG. 1 is a cross-sectional view illustrating an electric actuator of a first embodiment.

The disclosure provides an electric actuator having a structure that can absorb an assembly error of a bearing in an axial direction and can inhibit a problem of a projecting portion falling or the like out of a bore portion from arising.

According to one aspect of the disclosure, in the electric actuator, an assembly error of the bearing in an axial direction can be absorbed, and a problem of the projecting portion falling or the like out of the bore portion can be inhibited from arising.

In the drawings, a Z-axial direction is an up-down direction in which a positive side is an upper side, and a negative side is a lower side. An axial direction of a central axis J1 which is appropriately illustrated in the drawings is parallel to the Z-axial direction, that is, the up-down direction. In the following description, a direction parallel to the axial direction of the central axis J1 is simply referred to as an "axial direction Z". In addition, an X-axial direction and a Y-axial direction which are appropriately illustrated in the drawings are a horizontal direction orthogonal to the axial direction Z and are directions orthogonal to each other.

In addition, a radial direction with the central axis J1 as a center is simply referred to as a "radial direction", and a circumferential direction with the central axis J1 as a center is simply referred to as a "circumferential direction". In this embodiment, the lower side corresponds to one side in the axial direction, the upper side corresponds to the other side in the axial direction. Incidentally, the up-down direction, the horizontal direction, the upper side, and the lower side are names for simply describing a relative positional relationship between configurational elements, and thus an actual dispositional relationship or the like may be a dispositional relationship or the like other than a dispositional relationship or the like described by the names.

Figure 2:
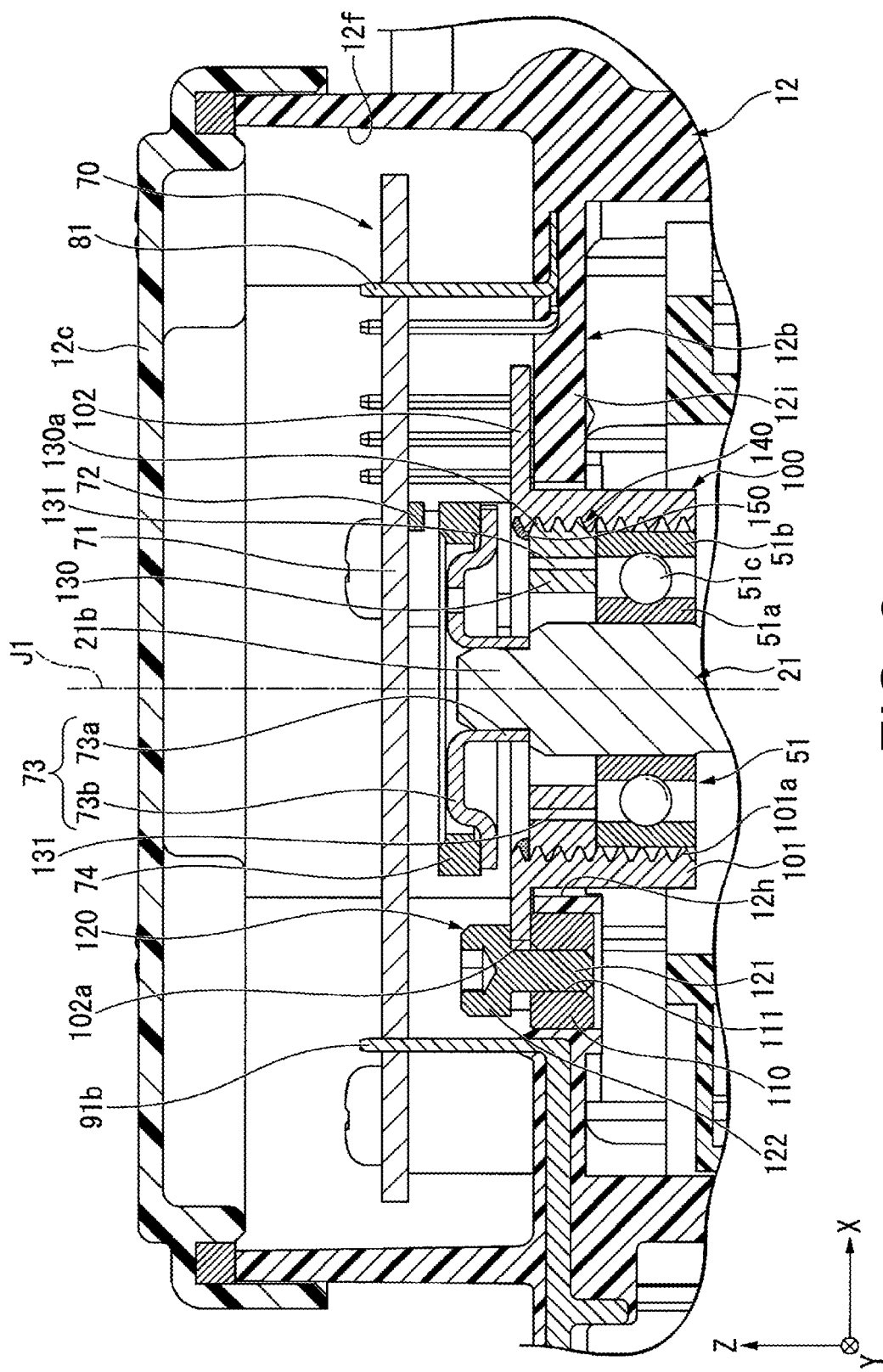
FIG. 2 is a cross-sectional view illustrating a part of the electric actuator of the first embodiment.

As illustrated in FIGS. 1 and 2, an electric actuator 10 of the embodiment includes a case 11, a bearing holder 100, a motor 20 having a motor shaft 21 extending in the axial direction Z of the central axis J1, a control unit 70, a connector unit 80, a speed reduction mechanism 30, an output unit 40, a rotation detecting device 60, a wiring member 90, a first bearing 51, a second bearing 52, a third bearing 53, and a bush 54.

In the embodiment, the first bearing 51, the second bearing 52, and the third bearing 53 are rolling bearings. The first bearing 51, the second bearing 52, and the third bearing 53 are ball bearings, for example. As illustrated in FIG. 2, the first bearing 51 has an inner ring 51a, an outer ring 51b positioned at an outer side in the radial direction from the inner ring 51a, and a plurality of balls 51c positioned between the inner ring 51a and the outer ring 51 b in the radial direction. The inner ring 51a and the outer ring 51b have an annular shape around the central axis J1. The plurality of balls 51c are disposed to be arranged along the circumferential direction, although not illustrated. The plurality of balls 51c couples the inner ring 51a and the outer ring 51b to each other. Similarly to the first bearing 51, the second bearing 52 and the third bearing 53 also have an inner ring, an outer ring, and a plurality of balls.

As illustrated in FIG. 1, the case 11 accommodates the motor 20 and the speed reduction mechanism 30. The case 11 has a motor case 12 that accommodates the motor 20 and the speed-reduction-mechanism case 13 that accommodates the speed reduction mechanism 30. The motor case 12 has a case-cylindrical portion 12a, a case wall 12b, a control-board accommodating portion 12f, an upper lid 12c, a terminal holder 12d, and a first wiring holder 14. That is, the case 11 has the case wall 12b. Members of the motor case 12 are made of a resin except for a metal member 110 to be described below.

The case-cylindrical portion 12a has a circular-cylinder shape extending in the axial direction Z around the central axis J1. The case-cylindrical portion 12a is open at both sides in the axial direction Z. The case-cylindrical portion 12a has a first opening portion 12g which is open at a lower side. That is, the motor case 12 has the first opening portion 12g. The case-cylindrical portion 12a surrounds the motor 20 at an outer side in the radial direction.

Figure 3:
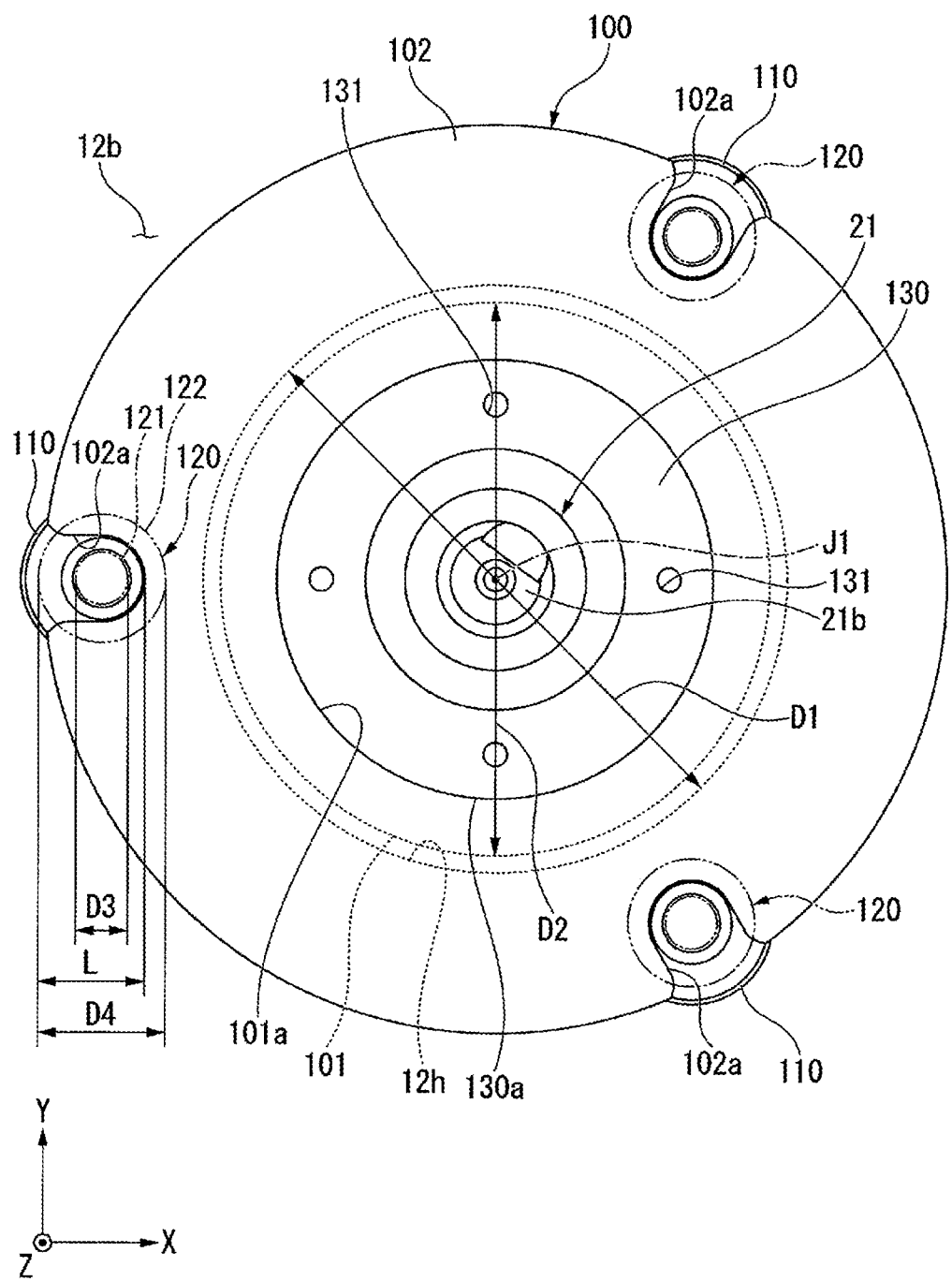
FIG. 3 is a view of a bearing holder of the first embodiment when viewed from above.

The case wall 12b has an annular shape expanding inward in the radial direction from an inner circumferential surface of the case-cylindrical portion 12a. The case wall 12b covers an upper side of a stator 23 to be described below of the motor 20. The case wall 12b has a through-hole 12h that penetrates the case wall 12b in the axial direction Z. As illustrated in FIG. 3, in the embodiment, the through-hole 12h has a circular shape around the central axis J1. An inner diameter D1 of the through-hole 12h is larger than an outer diameter D2 of a circumferential wall 101 to be described below. As illustrated in FIG. 2, the case wall 12b has a main wall body 12i made of a resin and the metal member 110 made of metal. The main wall body 12i has an annular region expanding inward in the radial direction from the inner circumferential surface of the case-cylindrical portion 12a.

The metal member 110 has an annular shape and has a female screw portion 111 at an inner circumferential surface thereof. For example, the metal member 110 is a nut. The metal member 110 is embedded in the main wall body 12i. More specifically, the metal member 110 is embedded in an inner edge portion of the main wall body 12i in the radial direction. The metal member 110 is positioned to be separated from an inner surface of the through-hole 12h in the radial direction toward an outer side in the radial direction. An upper surface of the metal member 110 is positioned above an upper surface of the main wall body 12i. The upper surface of the metal member 110 is a flat surface orthogonal to the axial direction Z. As illustrated in FIG. 3, in the embodiment, a plurality of the metal members 110 are arranged. The plurality of metal members 110 are disposed at equal intervals over an entire circumference along the circumferential direction. For example, three metal members 110 are arranged.

As illustrated in FIG. 1, the control-board accommodating portion 12f is a region in which a control board 71 to be described below is accommodated. The control-board accommodating portion 12f is configured to be positioned at an inner side of an upper region of the case-cylindrical portion 12a in the radial direction. A bottom surface of the control-board accommodating portion 12f is a top surface of the case wall 12b. The control-board accommodating portion 12f is open upward. The upper lid 12c is a plate-shaped lid that blocks an upper end opening of the control-board accommodating portion 12f. The terminal holder 12d projects outward in the radial direction from the case-cylindrical portion 12a. The terminal holder 12d has a circular-cylinder shape which is open at the outer side in the radial direction. The terminal holder 12d holds a terminal 81 to be described below.

The first wiring holder 14 projects outward in the radial direction from the case-cylindrical portion 12a. In FIG. 1, the first wiring holder 14 projects from the case-cylindrical portion 12a toward a negative side in the X-axial direction. The first wiring holder 14 extends in the axial direction Z. A position of an upper end portion of the first wiring holder 14 in the axial direction is substantially coincident with a position of the case wall 12b in the axial direction. For example, a position of the first wiring holder 14 in the circumferential direction is different from a position of the connector unit 80 in the circumferential direction.

The speed-reduction-mechanism case 13 is positioned below the motor case 12. The speed-reduction-mechanism case 13 has a main speed-reduction-mechanism case body 13i and a circular-cylinder member 16. The main speed-reduction-mechanism case body 13i is made of a resin. The main speed-reduction-mechanism case body 13i has a bottom wall 13a, a cylindrical portion 13b, a projecting cylindrical portion 13c, and a second wiring holder 15. The bottom wall 13a has an annular shape around the central axis J1. The bottom wall 13a covers a lower side of the speed reduction mechanism 30.

The cylindrical portion 13b has a circular-cylinder shape projecting upward from an outer edge portion of the bottom wall 13a in the radial direction. The cylindrical portion 13b is open upward. An upper end portion of the cylindrical portion 13b is in contact with and is fixed to a lower end portion of the case-cylindrical portion 12a. The projecting cylindrical portion 13c has a circular-cylinder shape projecting downward from an inner edge portion of the bottom wall 13a in the radial direction. The projecting cylindrical portion 13c is opened inward in the axial direction.

The second wiring holder 15 projects outward in the radial direction from the cylindrical portion 13b. In FIG. 1, the second wiring holder 15 projects from the cylindrical portion 13b toward the negative side in the X-axial direction, that is, the same side as the side toward which the first wiring holder 14 projects. The second wiring holder 15 is disposed below the first wiring holder 14. For example, the second wiring holder 15 has a box shape which has a cavity and is open upward. An inside of the second wiring holder 15 is connected to an inside of the cylindrical portion 13b. The second wiring holder 15 has a bottom wall 15a and a side wall 15b. The bottom wall 15a extends outward in the radial direction from the bottom wall 13a. In FIG. 1, the bottom wall 15a extends from the bottom wall 13a toward the negative side in the X-axial direction. The side wall 15b extends upward from an outer edge portion of the bottom wall 15a.

In the embodiment, the bottom wall 13a and the bottom wall 15a configure a bottom portion 13j of the main speed-reduction-mechanism case body 13i. The bottom portion 13j has a recessed accommodation portion 17 recessed upward from a lower surface of the bottom portion 13j. In the embodiment, the recessed accommodation portion 17 is arranged to straddle the bottom wall 13a and the bottom wall 15a.

The circular-cylinder member 16 has a circular-cylinder shape extending in the axial direction Z. More specifically, the circular-cylinder member 16 has a circular-cylinder shape having multiple steps which is open at both sides in the axial direction with the central axis J1 as a center. The circular-cylinder member 16 is made of metal. In the embodiment, the circular-cylinder member 16 is made of sheet metal. Therefore, the circular-cylinder member 16 can be manufactured by performing press-forming on a metal plate, and manufacturing costs of the circular-cylinder member 16 can be reduced. In the embodiment, the circular-cylinder member 16 is a non-magnetic member.

Figure 4:
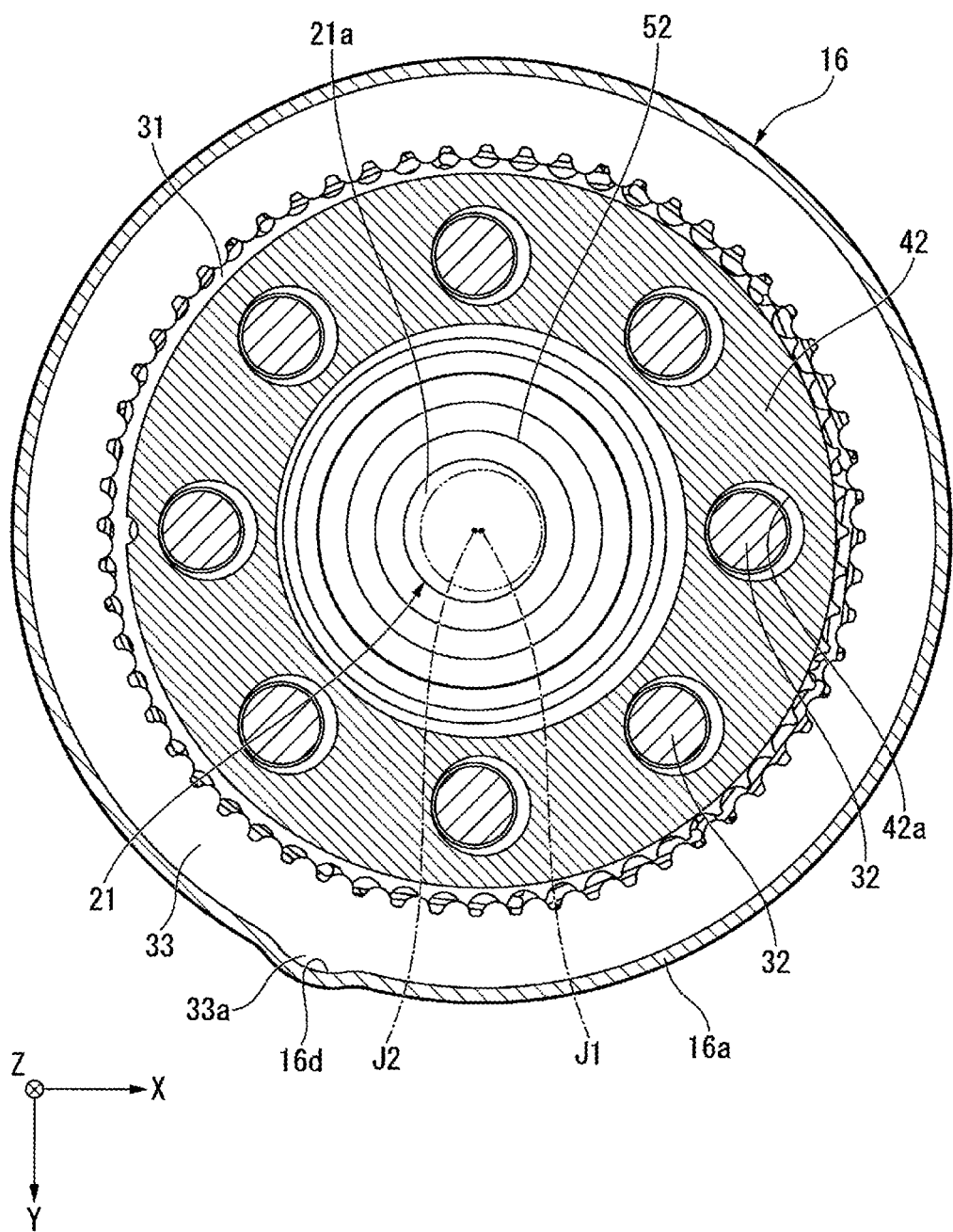
FIG. 4 is a cross-sectional view illustrating a part of the electric actuator of the first embodiment, that is, a cross-sectional view along a line IV-IV in FIG. 1.

The circular-cylinder member 16 is embedded in the main speed-reduction-mechanism case body 13i. The circular-cylinder member 16 has a large-diameter portion 16a, an annular portion 16b, and a small-diameter portion 16c. The large-diameter portion 16a is an upper region of the circular-cylinder member 16. The large-diameter portion 16a is embedded in the cylindrical portion 13b. An upper end portion of an inner circumferential surface of the large-diameter portion 16a is exposed inside the speed-reduction-mechanism case 13. As illustrated in FIG. 4, the large-diameter portion 16a has a recessed positioning portion 16d recessed outward in the radial direction at the inner circumferential surface. Incidentally, in FIG. 4, the main speed-reduction-mechanism case body 13i is not illustrated.

As illustrated in FIG. 1, the annular portion 16b is an annular region extending inward in the radial direction from a lower end portion of the large-diameter portion 16a. In the embodiment, the annular portion 16b has an annular plate shape around the central axis J1. The annular portion 16b is disposed at the bottom wall 13a. In the embodiment, the annular portion 16b is positioned at an upper surface of the bottom wall 13a. An outer edge portion of the annular portion 16b in the radial direction is embedded in the cylindrical portion 13b. A region of a top surface of the annular portion 16b is exposed inside the speed-reduction-mechanism case 13, the region being positioned at the inner side in the radial direction. The annular portion 16b covers a lower side of a first magnet 63.

The small-diameter portion 16c is a lower region of the circular-cylinder member 16. The small-diameter portion 16c extends downward from an inner edge portion of the annular portion 16b in the radial direction. Both an outer diameter and an inner diameter of the small-diameter portion 16c are smaller than both an outer diameter and an inner diameter of the large-diameter portion 16. The small-diameter portion 16c is fitted into the inner side of the projecting cylindrical portion 13c in the radial direction. The bush 54 having a circular-cylinder shape extending in the axial direction Z is disposed inside the small-diameter portion 16c. The bush 54 is fitted into the small-diameter portion 16c and is fixed in the projecting cylindrical portion 13c. The bush 54 has a bush flange 54a projecting outward in the radial direction at an upper end portion of the bush. The bush flange 54a comes into contact with the top surface of the annular portion 16b. Consequently, the bush 54 is inhibited from escaping downward from an inside of the small-diameter portion 16c.

The speed-reduction-mechanism case 13 has a second opening portion 13h which is open upward. In the embodiment, the second opening portion 13h is configured of an upper opening of the cylindrical portion 13b and an upper opening of the second wiring holder 15. The motor case 12 and the speed-reduction-mechanism case 13 are fixed to each other in a state in which the first opening portion 12g and the second opening portion 13h face each other in the axial direction Z. In a state in which the motor case 12 and the speed-reduction-mechanism case 13 are fixed to each other, an inside of the first opening portion 12g and an inside of the second opening portion 13h are connected to each other.

In the embodiment, the motor case 12 and the speed-reduction-mechanism case 13 are each manufactured by insert molding, for example. The motor case 12 is manufactured by insert molding in which the metal member 110 and a first wiring member 91 to be described below of the wiring member 90 are used as insert members. The speed-reduction-mechanism case 13 is manufactured by insert molding in which the circular-cylinder member 16 and a second wiring member 92 to be described below of the wiring member 90 are used as insert members.

Figure 5:
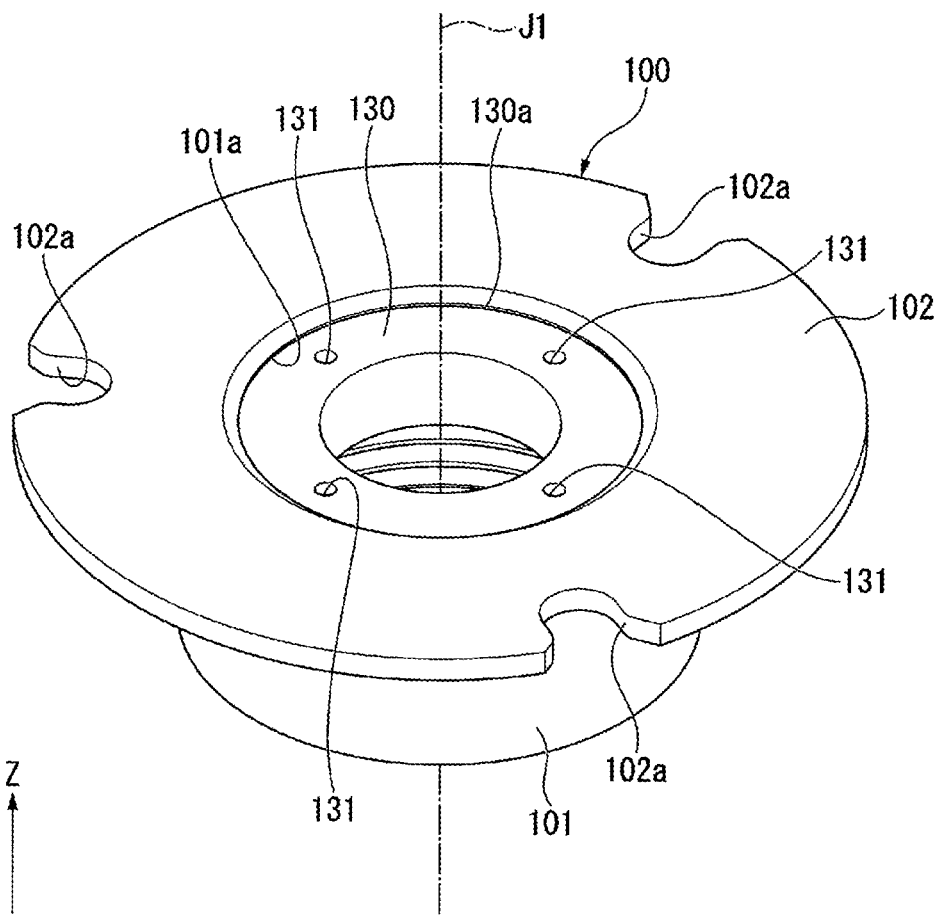
FIG. 5 is a perspective view illustrating the bearing holder of the first embodiment.

The bearing holder 100 is fixed to the motor case 12. The bearing holder 100 is made of metal. As illustrated in FIG. 5, the bearing holder 100 has the cylindrical circumferential wall 101, a fixing flange 102, and a support wall 130. In the embodiment, the circumferential wall 101 and the fixing flange 102 are configured to be a part of the same single member. The support wall 130 is a separate member from the circumferential wall 101 and the fixing flange 102.

The circumferential wall 101 has a cylindrical shape. In the embodiment, the circumferential wall 101 has a circular-cylinder shape around the central axis J1. As illustrated in FIG. 2, the circumferential wall 101 is positioned at an outer side in the radial direction from the first bearing 51. The circumferential wall 101 holds the first bearing 51 at an inner side in the radial direction. Consequently, the bearing holder 100 holds the first bearing 51. The outer ring 51b of the first bearing 51 is fitted at the inner side of the circumferential wall 101 via a gap in the radial direction. The circumferential wall 101 is inserted into the through-hole 12h. The circumferential wall 101 projects from an inside of the control-board accommodating portion 12f via the through-hole 12h toward a lower side below the case wall 12b.

As illustrated in FIG. 3, the outer diameter D2 of the circumferential wall 101 is smaller than the inner diameter D1 of the through-hole 12h. Therefore, at least a part in the circumferential direction of an outer surface of the circumferential wall 101 in the radial direction is positioned to be separated from the inner surface of the through-hole 12h in the radial direction toward the inner side in the radial direction. In an example illustrated in FIGS. 2 and 3, an outer surface of the circumferential wall 101 in the radial direction is positioned to be separated from the inner surface of the through-hole 12h in the radial direction toward the inner side in the radial direction.

As illustrated in FIG. 2, the circumferential wall 101 has a female screw portion 101a arranged at an inner circumferential surface of the circumferential wall 101. In the embodiment, the female screw portion 101a is arranged at the entire inner circumferential surface of the circumferential wall 101.

The fixing flange 102 extends outward in the radial direction from the circumferential wall 101. In the embodiment, the fixing flange 102 extends outward in the radial direction from an upper end portion of the circumferential wall 101. As illustrated in FIG. 5, the fixing flange 102 has an annular-plate shape around the central axis J1. The fixing flange 102 has a through-portion 102a that penetrates the fixing flange 102 in the axial direction Z. In the embodiment, the fixing flange 102 extends in the radial direction and is open outward in the radial direction. In other words, in the embodiment, the through-portion 102a is a region recessed inward in the radial direction from an outer edge portion of the fixing flange 102 in the radial direction.

An inner edge portion in the radial direction of the inner surface of the through-portion 102a has an arc shape recessed inward in the radial direction, when viewed in the axial direction Z. An opening portion of the through-portion 102a at the outer side in the radial direction has a dimension in the circumferential direction, the dimension increasing toward the outer side in the radial direction. In the embodiment, a plurality of the through-portions 102a are arranged. The plurality of through-portions 102a are disposed at equal intervals over a circumference along the circumferential direction. For example, three through-portions 102a are arranged. As illustrated in FIG. 3, an inside of the through-portion 102a is positioned above the metal member 110. A dimension L of the through-portion 102a in the radial direction is larger than an outer diameter D3 of a main screw body portion 121 to be described below. In the embodiment, the dimension L of the through-portion 102a in the radial direction corresponds to a distance in the radial direction between an inner end portion of the through-portion 102a in the radial direction and the outer edge portion of the fixing flange 102 in the radial direction. The dimension L of the through-portion 102a in the radial direction and a dimension thereof in the circumferential direction are smaller than an outer diameter of the metal member 110.

The fixing flange 102 is positioned above the case wall 12b. The fixing flange 102 is fixed to the case wall 12b. Consequently, the bearing holder 100 is arranged at the case wall 12b. In the embodiment, the fixing flange 102 is fixed to the case wall 12b with a plurality of screw members 120 that are fastened to the case wall 12b in the axial direction Z. That is, the electric actuator 10 further includes the plurality of screw members 120 that fix the fixing flange 102 to the case wall 12b. In the embodiment, the screw member 120 is fastened into the female screw portion 111 of the metal member 110 of the case wall 12b. For example, three screw members 120 are arranged.

As illustrated in FIG. 2, the screw member 120 has the main screw body portion 121 and a screw head 122. The main screw body portion 121 passes through the through-portion 102a so as to be fastened to the female screw portion 111 of the metal member 110. As illustrated in FIG. 3, the outer diameter D3 of the main screw body portion 121 is smaller than a dimension of the through-portion 102a in the radial direction. In the embodiment, a difference between the dimension L of the through-portion 102a in the radial direction and the outer diameter D3 of the main screw body portion 121 is larger than a difference between the inner diameter D1 of the through-hole 12h and the outer diameter D2 of the circumferential wall 101.

As illustrated in FIG. 2, the screw head 122 is arranged at an upper end portion of the main screw body portion 121. The screw head 122 is positioned above the fixing flange 102. The screw head 122 comes into contact with a circumferential edge portion of the through-portion 102a, of the upper surface of the fixing flange 102. As illustrated in FIG. 3, the external appearance of the screw head 122 has a circular shape when viewed in the axial direction Z, for example. An outer diameter D4 of the screw head 122 is larger than the dimension L of the through-portion 102a in the radial direction and the dimension of the through-portion 102a in the circumferential direction.

As described above, the screw members 120 are fastened to the metal member 110 from an upper side of the fixing flange 102 through the through-portions 102a, and thereby the fixing flange 102 is fixed to the case wall 12b. Consequently, the bearing holder 100 is fixed to the motor case 12. In the embodiment, three or more through-portions 102a and three or screw members 120 are disposed at equal intervals over the circumference along the circumferential direction. Therefore, the bearing holder 100 can be more strongly and stably fixed to the motor case 12. The outer edge portion of the fixing flange 102 in the radial direction is positioned at the inner side in the radial direction from an outer edge portion of the screw member 120 in the radial direction.

As illustrated in FIG. 2, the fixing flange 102 fixed by the screw member 120 comes into contact with the upper surface of the metal member 110. More specifically, of a lower surface of the fixing flange 102, a circumferential edge portion of the through-portion 102a comes into contact with the upper surface of the metal member 110. The fixing flange 102 is positioned to be separated from the main wall body 12i toward an upper side. Therefore, the fixing flange 102 can be positioned by the metal member 110 in the axial direction Z with high accuracy. In addition, the fixing flange 102 can be prevented from being inclined with respect to the axial direction Z. In addition, the fixing flange 102 does not come into direct contact with the main wall body 12i. Therefore, even when a difference in thermal deformation amount between the main wall body 12i made of a resin and the metal member 110 made of metal occurs due to a difference in linear expansion coefficient, stress can be inhibited from being applied to the main wall body 12i. Consequently, the main wall body 12i can be inhibited from being damaged, the metal member 110 can be inhibited from escaping from the main wall body 12i, and the like.

The support wall 130 has a ring shape having an inner diameter larger than an outer diameter of the inner ring 51a. In the embodiment, the support wall 130 has an annular shape around the central axis J1. The support wall 130 is positioned at the inner side in the radial direction from the circumferential wall 101. The support wall 130 surrounds the motor shaft 21 at an outer side in the radial direction from the motor shaft 21. In the embodiment, an inner circumferential surface of the support wall 130 is positioned at the outer side in the radial direction from an outer circumferential surface of the inner ring 51a. The support wall 130 is positioned on the first bearing 51. The support wall 130 supports the first bearing 51 from above. An undersurface of the support wall 130 comes into contact with a top surface of the first bearing 51. More specifically, the undersurface of the support wall 130 comes into contact with a top of the outer ring 51b. That is, in the embodiment, the support wall 130 supports the outer ring 51b from above.

The support wall 130 has a male screw portion 130a arranged at the outer circumferential surface of the support wall 130. In the embodiment, the male screw portion 130a is arranged over the entire outer circumferential surface of the support wall 130. The male screw portion 130a intermeshes with the female screw portion 101a. Consequently, the support wall 130 is fixed to the circumferential wall 101 with a screw.

The support wall 130 has a second bore portion 131 recessed downward from an upper surface of the support wall 130. In the embodiment, the second bore portion 131 penetrates the support wall 130 in the axial direction Z. As illustrated in FIGS. 3 and 5, a plurality of second bore portions 131 are arranged along the circumferential direction. The plurality of bore portions 131 are disposed at equal intervals over the circumference along the circumferential direction. For example, four second bore portions 131 are arranged. The second bore portion 131 has a circular shape when viewed in the axial direction Z. For example, the second bore portion 131 is positioned at a center of the inner circumferential surface and the outer circumferential surface of the support wall 130 in the radial direction.

As illustrated in FIG. 2, the bearing holder 100 has a position adjustment mechanism 140. The position adjustment mechanism 140 has the female screw portion 101a, the male screw portion 130a, and the second bore portion 131. The position adjustment mechanism 140 is a mechanism that can move the support wall 130 in the axial direction Z. In the embodiment, the male screw portion 130a is rotated around the central axis J1 with respect to the female screw portion 101a so as to change an intermeshing position, and thereby the support wall 130 can be moved in the axial direction Z. Specifically, a wrench or the like is inserted into the plurality of second bore portions 131 so as to rotate the second bore portion around the central axis J1, and thereby the support wall 130 can be moved in the axial direction Z.

Incidentally, in this specification, that "the position adjustment mechanism can move the support wall in the axial direction Z" may mean that it is possible to move the support wall in the axial direction Z when the electric actuator is assembled or that the support wall is fixed unmovably in the axial direction Z in a state that the electric actuator has been assembled. In the embodiment, the electric actuator 10 includes a fixer 150 that fixes the female screw portion 101a and the male screw portion 130a. For example, the fixer 150 is a screw locking agent. At least a part of the fixer 150 which is the screw locking agent is positioned between the female screw portion 101a and the male screw portion 130a in the radial direction and fixes the female screw portion 101a and the male screw portion 130a.

As illustrated in FIG. 1, the motor 20 has the motor shaft 21, a rotor body 22, and a stator 23. The motor shaft 21 rotates around the central axis J1. The motor shaft 21 is supported by the first bearing 51 and the third bearing 53 so as to be rotatable around the central axis J1. The first bearing 51 and the third bearing 53 are fixed to an outer circumferential surface of the motor shaft 21. The first bearing 51 is held by the bearing holder 100 and supports a region of the motor shaft 21 rotatably, the region being positioned above the rotor body 22. The third bearing 53 supports a region of the motor shaft 21 rotatably with respect to the speed-reduction-mechanism case 13, the region being positioned below the rotor body 22.

An upper end portion of the motor shaft 21 projects toward the upper side above the case wall 12b through the through-hole 12h. The motor shaft 21 has an eccentric shaft portion 21a formed around an eccentric axis J2 eccentric with respect to the central axis J1. The eccentric shaft portion 21a is positioned at the lower side below the rotor body 22. The inner ring of the second bearing 52 is fitted and fixed in the eccentric shaft portion 21a. Consequently, the second bearing 52 is fixed to the motor shaft 21.

The rotor body 22 is fixed to the motor shaft 21. The rotor body 22 has a rotor core having a circular-cylinder shape which is fixed to the outer circumferential surface of the motor shaft 21 and a magnet which is fixed to the rotor core, although not illustrated. The stator 23 faces the rotor body 22 via a gap in the radial direction. The stator 23 surrounds the rotor body 22 at the outer side in the radial direction from the rotor body 22. The stator 23 has a ring-shaped stator core 24 that surrounds an outer side of the rotor body 22 in the radial direction, an insulator 25 installed at the stator core 24, and a plurality of coils 26 installed at the stator core 24 via the insulator 25. The stator core 24 is fixed to the inner circumferential surface of the case-cylindrical portion 12a. Consequently, the motor 20 is held by the motor case 12.

The control unit 70 has the control board 71, a second attachment member 73, a second magnet 74, and a second rotation sensor 72. That is, the electric actuator 10 has the control board 71, the second attachment member 73, the second magnet 74, and the second rotation sensor 72.

The control board 71 has a plate shape expanding along a plane orthogonal to the axial direction Z. The control board 71 is accommodated in the motor case 12. More specifically, the control board 71 is accommodated in the control-board accommodating portion 12f and is disposed to be separated from the case wall 12b toward the upper side. The control board 71 is a board that is electrically connected to the motor 20. The coil 26 of the stator 23 is electrically connected to the control board 71. For example, the control board 71 controls a current which is supplied to the motor 20. That is, an inverter circuit is mounted on the control board 71, for example.

The second attachment member 73 has an annular shape around the central axis J1. As illustrated in FIG. 2, an inner circumferential surface of the second attachment member 73 is fixed to an outer circumferential surface of a diameter-decreased portion 21b positioned at an upper end portion of the motor shaft 21. The diameter-decreased portion 21b is a region having an outer diameter which is decreased. The second attachment member 73 is disposed above the first bearing 51 and the bearing holder 100. For example, the second attachment member 73 is a non-magnetic member. Incidentally, the second attachment member 73 may be a magnetic member. The second attachment member 73 has a cylindrical attachment portion 73a having a cylindrical shape which is fitted on the diameter-decreased portion 21b and an annular attachment portion 73b expanding outward in the radial direction from an upper end portion of the cylindrical attachment portion 73a. The annular attachment portion 73b has an annular plate shape around the central axis J1. An outer edge portion of the annular attachment portion 73b in the radial direction is recessed downward.

The second magnet 74 has an annular shape around the central axis J1. The second magnet 74 is fixed to an upper end surface of the outer edge portion of the annular attachment portion 73b in the radial direction. A method for fixing the second magnet 74 to the second attachment member 73 is not particularly limited, and the second magnet adheres to the second attachment member with an adhesive. The second attachment member 73 and the second magnet 74 rotates together with the motor shaft 21. The second magnet 74 is disposed above the first bearing 51 and the circumferential wall 101. The second magnet 74 has an N pole and an S pole which are alternately disposed along the circumferential direction.

The second rotation sensor 72 is a sensor that detects rotation of the motor 20. The second rotation sensor 72 is attached to an undersurface of the control board 71. The second rotation sensor 72 faces the second magnet 74 via a gap in the axial direction Z. The second rotation sensor 72 detects a magnetic field produced by the second magnet 74. The second rotation sensor 72 is a Hall element, for example. A plurality of, for example, three second rotation sensors 72 are arranged along the circumferential direction, although not illustrated. The second rotation sensor 72 detects a change in magnetic field which is produced by the second magnet 74 that is rotated together with the motor shaft 21, and thereby the second rotation sensor can detect the rotation of the motor shaft 21.

The connector unit 80 in FIG. 1 is a region in which the connector unit is connected to electric wiring outside the case 11. The connector unit 80 is arranged at the motor case 12. The connector unit 80 has the terminal holder 12d described above and a terminal 81. The terminal 81 is embedded and held in the terminal holder 12d. One end of the terminal 81 is fixed to the control board 71. The other end of the terminal 81 is exposed outside the case 11 via an inside of the terminal holder 12d. In the embodiment, the terminal 81 is a busbar, for example.

An external power supply is connected to the connector unit 80 via electric wiring not illustrated. More specifically, the external power supply is attached to the terminal holder 12d, and electric wiring of the external power supply is electrically connected to a region of the terminal 81, the region being exposed in the terminal holder 12d. Consequently, the terminal 81 electrically connects the control board 71 and the electric wiring to each other. Hence, in the embodiment, electric power is supplied from the external power supply to the coil 26 of the stator 23 via the terminal 81 and the control board 71.

The speed reduction mechanism 30 is disposed at the outer side in the radial direction from a lower region of the motor shaft 21. The speed reduction mechanism 30 is accommodated inside the speed-reduction-mechanism case 13. The speed reduction mechanism 30 is disposed between the bottom wall 13a and the annular portion 16b and the motor 20 in the axial direction Z. The speed reduction mechanism 30 has an external gear 31, a plurality of projecting portions 32, an internal gear 33, and an output flange 42.

The external gear 31 has a substantially annular plate shape expanding along a plane orthogonal to the axial direction Z, with the eccentric axis J2 of the eccentric shaft portion 21a as a center. As illustrated in FIG. 4, a gear portion is arranged at an outer surface of the external gear 31 in the radial direction. The external gear 31 is coupled to the eccentric shaft portion 21a via the second bearing 52. Consequently, the speed reduction mechanism 30 is coupled to a lower region of the motor shaft 21. The external gear 31 is fitted on the outer ring of the second bearing 52 from the outer side in the radial direction. Consequently, the second bearing 52 couples the motor shaft 21 and the external gear 31 to each other in a relatively rotatable manner around the eccentric axis J2.

As illustrated in FIG. 1, the plurality of projecting portions 32 project from the external gear 31 toward the output flange 42 in the axial direction Z. The projecting portion 32 has a circular-column shape projecting downward. As illustrated in FIG. 4, the plurality of projecting portions 32 are disposed along the circumferential direction. More specifically, the plurality of projecting portions 32 are disposed at equal intervals over a circumference along the circumferential direction around the eccentric axis J2.

The internal gear 33 surrounds the outer side of the external gear 31 in the radial direction so as to be fixed to the case 11 and intermeshes with the external gear 31. The internal gear 33 has an annular shape around the central axis J1. As illustrated in FIG. 1, the internal gear 33 is positioned at an inner side in the radial direction of an upper end portion of the circular-cylinder member 16. The internal gear 33 is fixed to an inner circumferential surface of the metal circular-cylinder member 16. Therefore, while the main speed-reduction-mechanism case body 13i is made of a resin, the internal gear 33 can be strongly fixed to the speed-reduction-mechanism case 13. Consequently, the internal gear 33 can be inhibited from moving with respect to the speed-reduction-mechanism case 13, and a position of the internal gear 33 can be inhibited from being displaced. In the embodiment, the internal gear 33 is fixed by being press-fitted into the inner circumferential surface of the large-diameter portion 16a. In this manner, the speed reduction mechanism 30 is fixed to the inner circumferential surface of the circular-cylinder member 16 and is held by the speed-reduction-mechanism case 13. As illustrated in FIG. 4, a gear portion is arranged at an inner circumferential surface of the internal gear 33. The gear portion of the internal gear 33 intermeshes with the gear portion of the external gear 31. More specifically, the gear portion of the internal gear 33 partially intermeshes with the gear portion of the external gear 31.

The internal gear 33 has a projecting positioning portion 33a projecting outward in the radial direction. The projecting positioning portion 33a is fitted in the recessed positioning portion 16d arranged at the large-diameter portion 16a. Consequently, the projecting positioning portion 33a is caught in the recessed positioning portion 16d, and the internal gear 33 can be inhibited from relatively rotating with respect to the circular-cylinder member 16 in the circumferential direction.

The output flange 42 is a part of the output unit 40. The output flange 42 is positioned below the external gear 31. The output flange 42 has an annular plate shape expanding in the radial direction around the central axis J1. The output flange 42 expands outward in the radial direction from an upper end portion of an output shaft 41 to be described below. As illustrated in FIG. 1, the output flange 42 comes into contact with the bush flange 54a from above.

The output flange 42 has a plurality of first bore portions 42a. In the embodiment, the plurality of first bore portions 42a penetrate the output flange 42 in the axial direction Z. As illustrated in FIG. 4, the plurality of first bore portions 42a are disposed along the circumferential direction. More specifically, the plurality of first bore portions 42a are disposed at equal intervals over a circumference along the circumferential direction around the central axis J1. The first bore portion 42a has a circular shape when viewed in the axial direction Z. An inner diameter of the first bore portion 42a is larger than an outer diameter of the projecting portion 32. The plurality of projecting portions 32 arranged at the external gear 31 are inserted into the plurality of first bore portions 42a, respectively. An outer circumferential surface of the projecting portion 32 is inscribed in an inner circumferential surface of the first bore portion 42a. The inner circumferential surface of the first bore portion 42a supports the external gear 31 via the projecting portion 32 in an oscillatory manner around the central axis J1. In other words, the plurality of projecting portions 32 support the external gear 31 via an inner surface of the first bore portion 42a in an oscillatory manner around the central axis J1.

The output unit 40 is a region that outputs a drive force of the electric actuator 10. As illustrated in FIG. 1, the output unit 40 is accommodated in the speed-reduction-mechanism case 13. The output unit 40 has the output shaft 41 and the output flange 42. That is, the electric actuator 10 has the output shaft 41 and the output flange 42. In the embodiment, the output unit 40 is a single member.

The output shaft 41 extends in the axial direction Z of the motor shaft 21 at a lower side of the motor shaft 21. The output shaft 41 has a circular-cylinder portion 41a and a main output-shaft body portion 41b. The circular-cylinder portion 41a has a circular-cylinder shape extending downward from an inner edge of the output flange 42. The circular-cylinder portion 41a has a bottomed circular-cylinder shape which is open at the upper side. The circular-cylinder portion 41a is fitted at an inner side of the bush 54 in the radial direction. Consequently, the output shaft 41 is rotatably supported by the circular-cylinder member 16 via the bush 54. As described above, the speed reduction mechanism 30 is fixed to the circular-cylinder member 16. Therefore, the metal circular-cylinder member 16 can support both the speed reduction mechanism 30 and the output shaft 41. Consequently, the speed reduction mechanism 30 and the output shaft 41 can be disposed with high axial accuracy.

The third bearing 53 is accommodated inside the circular-cylinder portion 41a. The outer ring of the third bearing 53 is fitted in an inside of the circular-cylinder portion 41a. Consequently, the third bearing 53 is coupled to both the motor shaft 21 and the output shaft 41 in a relatively rotatably manner. A lower end portion of the motor shaft 21 is positioned inside the circular-cylinder portion 41a. A lower end surface of the motor shaft 21 faces a top surface of a bottom portion of the circular-cylinder portion 41a via a gap.

The main output-shaft body portion 41b extends downward from the bottom portion of the circular-cylinder portion 41a. In the embodiment, the main output-shaft body portion 41b has a circular-column shape around the central axis J1. An outer diameter of the main output-shaft body portion 41b is smaller than both an outer diameter and an inner diameter of the circular-cylinder portion 41a. A lower end portion of the main output-shaft body portion 41b projects toward a lower side below the projecting cylindrical portion 13c. Another member, to which a drive force of the electric actuator 10 is output, is attached to the lower end portion of the main output-shaft body portion 41b.

When the motor shaft 21 is rotated around the central axis J1, the eccentric shaft portion 21a revolves around the central axis J1 in the circumferential direction. Revolution of the eccentric shaft portion 21a is transmitted to the external gear 31 via the second bearing 52, and the external gear 31 oscillates, while an inscribed position of the outer circumferential surface of the projecting portion 32 in the inner circumferential surface of the first bore portion 42a is changed. Consequently, an intermeshing position of the gear portion of the external gear 31 with the gear portion of the internal gear 33 is changed in the circumferential direction. Hence, a rotating force of the motor shaft 21 is transmitted to the internal gear 33 via the external gear 31.

Here, in the embodiment, the internal gear 33 is fixed and is not rotated. Therefore, the external gear 31 is rotated around the eccentric axis J2 due to a reaction force of the rotating force transmitted to the internal gear 33. In this case, a rotating orientation of the external gear 31 is opposite to a rotating orientation of the motor shaft 21. The rotation of the external gear 31 around the eccentric axis J2 is transmitted to the output flange 42 via the first bore portion 42a and the projecting portion 32. Consequently, the output shaft 41 is rotated around the central axis J1. In this manner, the rotation of the motor shaft 21 is transmitted to the output shaft 41 via the speed reduction mechanism 30.

The rotation of the output shaft 41 is reduced with respect to the rotation of the motor shaft 21 by the speed reduction mechanism 30. Specifically, in a configuration of the speed reduction mechanism 30 in the embodiment, a reduction ratio R of the rotation of the output shaft 41 to the rotation of the motor shaft 21 is represented by a relationship of $R=-(N2-N1)/N2$. A minus sign at the beginning of an expression of the reduction ratio R indicates that an orientation of the rotation of the output shaft 41 which is reduced in speed is opposite to the rotating orientation of the motor shaft 21. N1 represents the number of teeth of the external gear 31, and N2 represents the number of teeth of the internal gear 33. As an example, when the number N1 of teeth of the external gear 31 is 59, the number N2 of teeth of the internal gear 33 is 60, the reduction ratio R is −1/60.

In this manner, according to the speed reduction mechanism 30 of the embodiment, it is possible to relatively increase the reduction ratio R of the rotation of the output shaft 41 to the rotation of the motor shaft 21. Therefore, it is possible to relatively increase rotational torque of the output shaft 41.

The rotation detecting device 60 detects rotation of the output unit 40. The rotation detecting device 60 has the first magnet 63, a coating portion 62, and a first rotation sensor 61. The first magnet 63 has an annular shape around the central axis J1. The first magnet 63 is attached to the output unit 40. More specifically, the first magnet 63 is fixed to an undersurface of the output flange 42. The first magnet 63 is positioned below the projecting portion 32. A lower end portion of the first magnet 63 faces an upper side of the annular portion 16b via a gap.

The first rotation sensor 61 is positioned inside the recessed accommodation portion 17. The first rotation sensor 61 is positioned below the first magnet 63 with the annular portion 16b interposed therebetween. The first rotation sensor 61 detects a magnetic field produced by the first magnet 63. The first rotation sensor 61 is a Hall element, for example. The first rotation sensor 61 detects a change in magnetic field which is produced by the first magnet 63 that is rotated together with the output unit 40, and thereby the first rotation sensor can detect the rotation of the output unit 40. Here, according to the embodiment, the circular-cylinder member 16 is a non-magnetic member. Therefore, even when the circular-cylinder member 16 is positioned between the first magnet 63 and the first rotation sensor 61, decrease in detection accuracy of the magnetic field of the first magnet 63 by the first rotation sensor 61 can be inhibited.

The coating portion 62 is positioned inside the recessed accommodation portion 17. In the embodiment, an inside of the recessed accommodation portion 17 is filled with the coating portion 62. The coating portion 62 is made of a resin. The first rotation sensor 61 is embedded in and is covered with the coating portion 62.

The wiring member 90 is electrically connected to the first rotation sensor 61. In the embodiment, the wiring member 90 is a member that connects the first rotation sensor 61 of the rotation detecting device 60 and the control board 71 of the control unit 70 to each other. In the embodiment, the wiring member 90 is a slender plate-shaped busbar. In the embodiment, three wiring members 90 are arranged, although not illustrated. Each of the wiring member 90 is configured to have the first wiring member 91 and the second wiring member 92 which are connected to each other.

The first wiring member 91 extends from an inside of the second wiring holder 15 to an inside of the control-board accommodating portion 12f. A part of the first wiring member 91 is embedded in the first wiring holder 14, the case-cylindrical portion 12a, and the main wall body 12i. Consequently, the first wiring member 91 is held by the motor case 12.

A lower end portion 91a of the first wiring member 91 projects downward from the first wiring holder 14 and is positioned inside the second wiring holder 15. An upper end portion 91b of the first wiring member 91 projects upward from the main wall body 12i and is connected to the control board 71. Consequently, the first wiring member 91 is electrically connected to the control board 71 and is electrically connected to electric wiring outside the case 11 via the connector unit 80.

A part of the second wiring member 92 is embedded in the bottom portion 13j. Consequently, the second wiring member 92 is held by the speed-reduction-mechanism case 13. An upper end portion 92a of the second wiring member 92 projects upward from the bottom wall 15a. The upper end portion 92a of the second wiring member 92 is connected to the lower end portion 91a of the first wiring member 91. A lower end portion 92b of the second wiring member 92 penetrates the bottom portion 13j and projects to the inside of the recessed accommodation portion 17. The lower end portion 92b corresponds to one end portion of the wiring member 90. Consequently, the wiring member 90 penetrates the case 11 from an inside of the case 11, and one end portion projects to the inside of the recessed accommodation portion 17. The lower end portion 92b is connected to the first rotation sensor 61. Consequently, the first rotation sensor 61 is connected to the one end portion of the wiring member 90. The lower end portion 92b is embedded in and is covered with the coating portion 62. In this manner, the one end portion of the wiring member 90 and the first rotation sensor 61 are embedded in and is covered with the coating portion 62, and thus the one end portion of the wiring member 90 and the first rotation sensor 61 which are positioned in the recessed accommodation portion 17 can be prevented from coming into contact with water or the like.

According to the embodiment, the bearing holder 100 has the position adjustment mechanism 140 configured to move the support wall 130 in the axial direction Z. Therefore, a position of the support wall 130 in the axial direction Z can be adjusted depending on the position of the first bearing 51 in the axial direction Z, the first bearing being fixed to the motor shaft 21. Consequently, while an assembly error of the first bearing 51 in the axial direction Z is absorbed, the support wall 130 can support the first bearing 51 from above, and the first bearing 51 can be inhibited from moving upward. Consequently, the motor shaft 21 can be inhibited from moving significantly upward together with the first bearing 51, compared with a case where a wave washer supports the first bearing 51 from above. Hence, the external gear 31 fixed to the motor shaft 21 via the second bearing 52 can be inhibited from moving significantly upward. As described above, according to the embodiment, the assembly error of the first bearing 51 in the axial direction Z can be absorbed, and a problem of the projecting portion 32 falling or the like out of the first bore portion 42a can be inhibited from arising.

In addition, according to the embodiment, the position adjustment mechanism 140 has the female screw portion 101a and the male screw portion 130a which intermesh with each other. Therefore, it is possible to easily move the support wall 130 in the axial direction Z by rotating the male screw portion 130a to change an intermeshing position thereof.

In addition, according to the embodiment, the position adjustment mechanism 140 has the second bore portion 131 recessed downward from the upper surface of the support wall 130. Therefore, a wrench or the like is inserted into the second bore portion 131 so as to perform rotation, and thereby the support wall 130 can be easily rotated. Consequently, the male screw portion 130a can be easily rotated to change the intermeshing position thereof, and the support wall 130 can be more easily moved in the axial direction Z.

In addition, according to the embodiment, the electric actuator 10 includes the fixer 150 that fixes the female screw portion 101a and the male screw portion 130a. Therefore, it is possible to inhibit the male screw portion 130a from rotating and the position of the support wall 130 from being displaced in the axial direction Z. Consequently, it is possible to inhibit the first bearing 51 and the motor shaft 21 from being displaced in the axial direction Z.

In addition, according to the embodiment, the support wall 130 has a ring shape having the inner diameter larger than the outer diameter of the inner ring 51a and supports the outer ring 51b from above. Therefore, it is possible to achieve a state in which the support wall 130 pushes the outer ring 51b downward, by adjusting the position of the support wall 130 in the axial direction Z during assembly. Consequently, it is possible to apply downward precompression to the first bearing 51. In addition, it is possible to downward precompression to the motor shaft 21 via the first bearing 51. Consequently, it is possible to inhibit the motor shaft 21 from being displaced upward.

In addition, according to the embodiment, the inner diameter D1 of the through-hole 12h is larger than the outer diameter D2 of the circumferential wall 101, and at least a part in the circumferential direction of an outer surface of the circumferential wall 101 in the radial direction is positioned to be separated from the inner surface of the through-hole 12h in the radial direction toward the inner side in the radial direction. Therefore, before the bearing holder 100 is fixed to the case wall 12b, the bearing holder 100 can be moved in the radial direction by an equivalent length of a gap between the inner surface of the through-hole 12h in the radial direction and the outer surface of the circumferential wall 101 in the radial direction. Consequently, a position of the first bearing 51 in the radial direction can be adjusted with respect to the motor case 12. Hence, even when a position of the third bearing 53 in the radial direction is displaced with respect to the motor case 12 due to the assembly error or the like, for example, the position of the first bearing 51 in the radial direction can be matched with the position of the third bearing 53 in the radial direction, and the first bearing 51 and the third bearing 53 can be disposed with high axial accuracy. Therefore, the motor shaft 21 supported by the first bearing 51 and the third bearing 53 can be inhibited from being inclined, and axial accuracy of the motor shaft 21 can be improved. Consequently, noise and vibration produced from the electric actuator 10 can be inhibited from significantly increasing.

Incidentally, in the drawings, the configuration is described, in which a center of the circumferential wall 101 and a center of the through-hole 12h are coincident with the central axis J1, and the entire outer surface of the circumferential wall 101 in the radial direction is separated from the inner surface of the through-hole 12h in the radial direction toward the inner side in the radial direction; however, the disclosure is not limited thereto. Even in some case, the center of the through-hole 12h is not coincident with the central axis J1, according to an adjustment amount of the position of the bearing holder 100 in the radial direction. In addition, a part of the outer surface of the circumferential wall 101 in the radial direction can also come into contact with an inner surface of the through-hole 12h in the radial direction.

In addition, according to the embodiment, the fixing flange 102 is fixed by the screw member 120 passing through the through-portion 102a, and the dimension L of the through-portion 102a in the radial direction is larger than the outer diameter D3 of the main screw body portion 121. Therefore, even when the position of the bearing holder 100 in the radial direction is adjusted, and the adjustment amount thereof is within a range of a difference between the dimension L of the through-portion 102a in the radial direction and the outer diameter D3 of the main screw body portion 121, the main screw body portion 121 can pass through the through-portion 102a, and the screw member 120 can be fastened to the female screw portion 111 of the metal member 110. Consequently, while the position of the bearing holder 100 in the radial direction is adjusted, the bearing holder 100 can be fixed to the case wall 12b with the screw member 120.

In addition, according to the embodiment, the difference between the dimension L of the through-portion 102a in the radial direction and the outer diameter D3 of the main screw body portion 121 is larger than the difference between the inner diameter D1 of the through-hole 12h and the outer diameter D2 of the circumferential wall 101. Therefore, when the circumferential wall 101 is positioned within a movable range in the radial direction, it is possible to fix the bearing holder 100 to the case wall 12b with the screw member 120, even by adjusting the position of the bearing holder 100 in the radial direction to any position.

In addition, according to the embodiment, the through-portion 102a extends in the radial direction and is open outward in the radial direction. Therefore, it is easy to increase the dimension L of the through-portion 102a in the radial direction, and an allowable position adjustment amount of the bearing holder 100 in the radial direction can be increased.

In addition, according to the embodiment, the third bearing 53 is coupled to both the motor shaft 21 and the output shaft 41 in a relatively rotatably manner. Therefore, the axial accuracy of the first bearing 51 and the third bearing 53 can be improved, and thereby axial accuracy of the motor shaft 21 and the output shaft 41 can be improved.

In addition, when the motor shaft 21 and the output shaft 41 are coupled to each other by the third bearing 53, the third bearing 53 is indirectly supported by the speed-reduction-mechanism case 13 via the output shaft 41. Therefore, the third bearing 53 is more likely to have a stable position, and an axis of the motor shaft 21 is more likely to wobble, compared with a case where the third bearing 53 is directly supported by the speed-reduction-mechanism case 13. By contrast, according to the embodiment, the axial accuracy of the motor shaft 21 can be improved as described above, and thus the axis of the motor shaft 21 can be inhibited from wobbling. That is, when the motor shaft 21 and the output shaft 41 are coupled to each other by the third bearing 53, an effect of making it possible to improve the axial accuracy of the motor shaft 21 is more effectively obtained in the embodiment.

Second Embodiment

Figure 6:
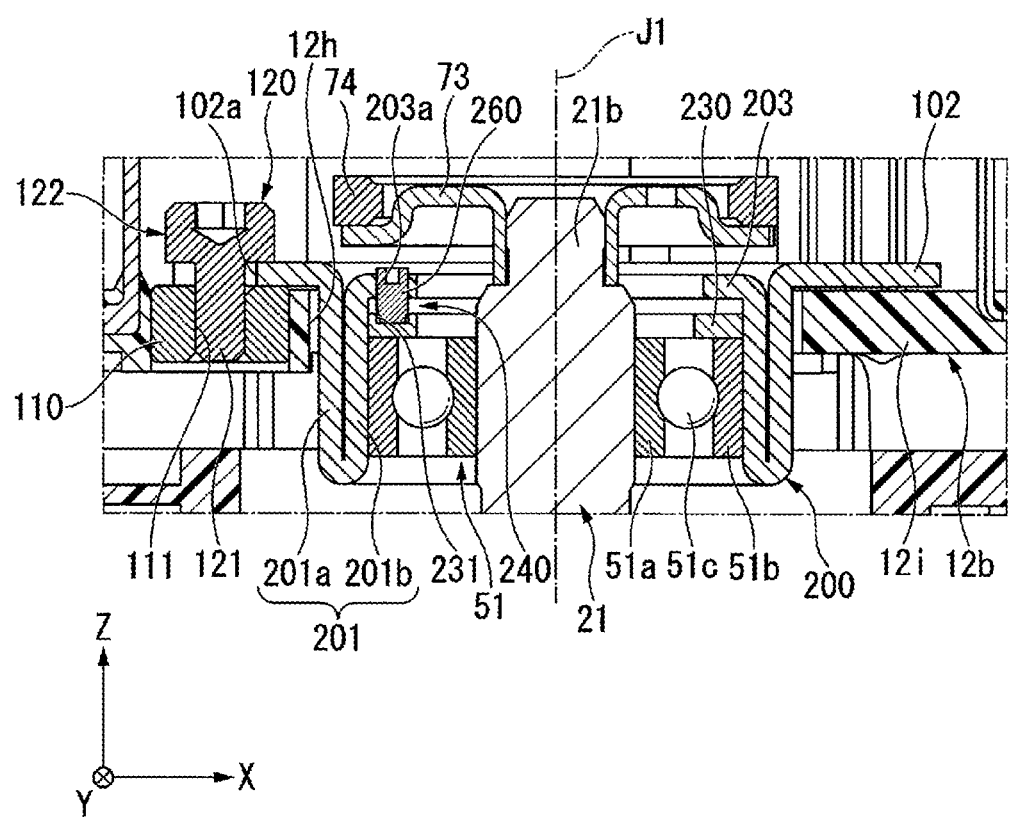
FIG. 6 is a cross-sectional view illustrating a part of an electric actuator of a second embodiment.

As illustrated in FIG. 6, in the embodiment, a circumferential wall 201 does not have the female screw portion 101a, unlike the first embodiment. In the embodiment, the circumferential wall 201 has an outer cylindrical portion 201a and an inner cylindrical portion 201b. The outer cylindrical portion 201a has a circular-cylinder shape extending downward from an inner edge portion of the fixing flange 102 in the radial direction. An outer surface of the outer cylindrical portion 201a in the radial direction is an outer surface of the circumferential wall 201 in the radial direction. The inner cylindrical portion 201b has a circular-cylinder shape extending upward from a lower end portion of the outer cylindrical portion 201a at an inner side of the outer cylindrical portion 201a in the radial direction. An outer surface of the inner cylindrical portion 201b in the radial direction comes into contact with the inner surface of the outer cylindrical portion 201a in the radial direction. In this manner, the circumferential wall 201 is configured of the two cylindrical portions which overlap each other in the radial direction, and thereby strength of the circumferential wall 201 can be improved. The first bearing 51 is held at an inner side of the inner cylindrical portion 201b in the radial direction. An upper end portion of the inner cylindrical portion 201b is positioned at an upper side above the first bearing 51. The upper end portion of the inner cylindrical portion 201b is positioned at a lower side slightly below an upper end portion of the outer cylindrical portion 201a.

In the embodiment, a support wall 230 has an annular plate shape around the central axis J1. The support wall 230 does not have the male screw portion 130a unlike the first embodiment. The support wall 230 is fitted in a space at an inner side of the circumferential wall 201 in the radial direction via a gap. An undersurface of the support wall 230 comes into contact with the top surface of the outer ring 51b. The support wall 230 has a recessed portion 231 recessed downward from a top surface of the support wall 230. A plurality of recessed portions 231 are arranged along the circumferential direction, although not illustrated.

The bearing holder 200 has a projecting wall 203 that projects inward in the radial direction from the circumferential wall 201. In the embodiment, the projecting wall 203 projects inward in the radial direction from an upper end portion of the circumferential wall 201. The projecting wall 203 has an annular plate shape around the central axis J1. The motor shaft 21 passes through a space at an inner side of the projecting wall 203 in the radial direction. An upper surface of the projecting wall 203 is positioned at a lower side below the upper surface of the fixing flange 102. The projecting wall 203 is positioned to be separated from the outer ring 51b of the first bearing 51 toward the upper side. The projecting wall 203 is positioned above the support wall 230.

Figure 7:
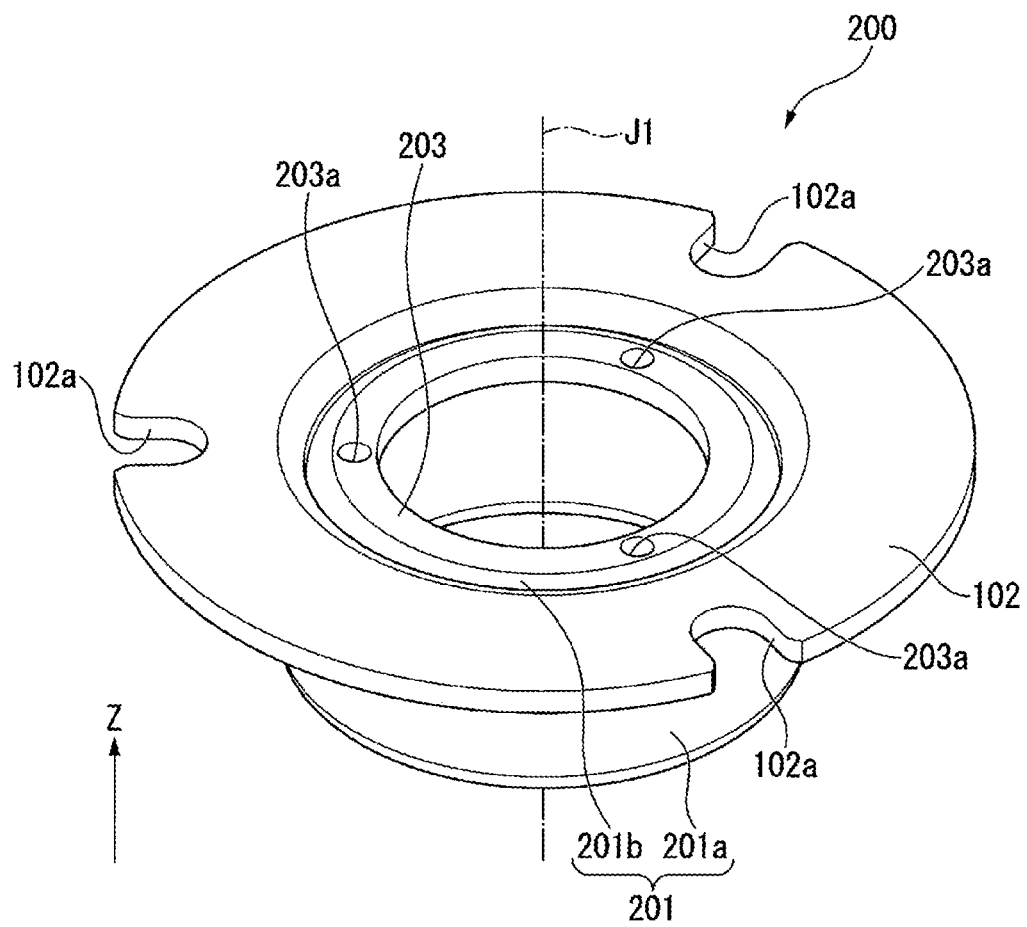
FIG. 7 is a perspective view illustrating a bearing holder of the second embodiment.

The projecting wall 203 has a female screw 203a that penetrates the projecting wall 203 in the axial direction Z. The female screw 203a has a female screw portion at an inner circumferential surface thereof. As illustrated in FIG. 7, a plurality of female screw holes 203a are arranged along the circumferential direction. In the embodiment, the plurality of female screw holes 203a are disposed at equal intervals over a circumference along the circumferential direction. For example, three female screw holes 203a are arranged.

In the embodiment, the circumferential wall 201, the fixing flange 102, and the projecting wall 203 are a part of the same single member and are made of sheet metal. Therefore, the single member having the circumferential wall 201, the fixing flange 102, and the projecting wall 203 can be manufactured by press-forming on a metal plate, and manufacturing costs of the bearing holder 200 can be reduced. The support wall 230 is a separate member from the circumferential wall 201, the fixing flange 102, and the projecting wall 203

As illustrated in FIG. 6, a position adjustment mechanism 240 has a female screw hole 203a and a screw member 260. A screw member 260 extends in the axial direction and has a male screw portion intermeshing with the female screw portion of the female screw hole 203a on an outer circumferential surface. The screw member 260 penetrates the female screw hole 203a in the axial direction Z. A lower end portion of the screw member 260 comes into contact with an upper surface of the support wall 230. Consequently, the screw member 260 supports the support wall 230 from above.

In the embodiment, the lower end portion of the screw member 260 is inserted into the recessed portion 231 and comes into contact with a bottom surface of the recessed portion 231. Therefore, the lower end portion of the screw member 260 is caught at an inner surface of the recessed portion 231, and thus the support wall 230 can be inhibited from rotating in the circumferential direction. A plurality of the screw members 260 are arranged, although not illustrated. The plurality of screw members 260 are fastened in the female screw holes 203a, respectively, and the lower end portions come into contact with the upper surface of the support wall 230.

According to the embodiment, the screw members 260 are fastened in the female screw holes 203a, and a position in the axial direction Z is adjusted. In this manner, the support wall 230 can be pushed by the screw members 260 so as to be moved. Consequently, the position of the support wall 230 in the axial direction Z. For example, the plurality of screw members 260 are fastened in the female screw holes 203a from a state illustrated in FIG. 6 so as to be moved downward, and thereby the support wall 230 can be easily moved downward. Hence, according to the embodiment, similarly to the first embodiment, an assembly error of the first bearing 51 in the axial direction Z can be absorbed, and a problem of the projecting portion 32 falling or the like out of the first bore portion 42a can be inhibited from arising.

The disclosure is not limited to the embodiment described above and can employ another configuration. The through-portion arranged at the fixing flange is not particularly limited, as long as the through-portion penetrates the fixing flange in the axial direction Z. The through-portion may be a hole which is not open at the outer side in the radial direction. The number of screw members with which the bearing holder is fixed to the case wall is not particularly limited. A method for fixing the bearing holder to the case wall is limited to using the screw member and is not particularly limited. For example, the bearing holder may be fixed to the case wall by using an adhesive, or the bearing holder may be fixed to the case wall by welding. For example, the bearing holder may be manufactured by die-casting, for example. For example, the bearing holder may have a configuration in which the circumferential wall is integrally molded with the case wall. In this case, the fixing flange may not be arranged. The case wall may not have the metal member. In this case, a main case-wall body may be made metal, and the main case-wall body may have a female screw.

The position adjustment mechanism is not particularly limited, as long as the position adjustment mechanism can move the support wall in the axial direction Z. For example, the position adjustment mechanism may be a mechanism that can adjust a position of the support wall in the axial direction Z by using a rack and pinion. In this case, a ratchet mechanism that allows the support wall to move downward and prevents the support wall from moving upward may be arranged. The position adjustment mechanism enables the support wall to move in the axial direction Z for each circumferential wall. In this case, for example, a female screw portion may be arranged at an inner circumferential surface of the ring-shaped case wall, and a male screw portion which intermeshes with the female screw portion may be arranged on an outer circumferential surface of the circumferential wall. In addition, in this case, the support wall is fixed to the circumferential wall. According to this configuration, the circumferential wall is rotated around the central axis J1 so as to change an intermeshing position, and thereby the support wall can be moved together with the circumferential wall in the axial direction Z. The second bore portion arranged at the support wall may not penetrate the support wall. The second bore portion may not be arranged. In the first embodiment, the female screw portion may be arranged in only a part of the inner circumferential surface of the circumferential wall 101.

The fixer is not particularly limited, as long as the fixer can fix the female screw portion and the male screw portion. For example, the fixer in such a configuration of the first embodiment may be a member having a male screw portion that is positioned above the support wall 130 and is fastened in the female screw portion 101a. In this case, the corresponding member and the support wall 130 are fastened to each other, and the male screw portion 130a of the support wall 130 can be inhibited from being loosened. In addition, the fixer may be a calking portion at which a part of the bearing holder is calked. The fixer may not be arranged.

The speed reduction mechanism is not particularly limited. In the embodiments described above, the plurality of projecting portions 32 are configured to project from the external gear 31 toward the output flange 42 in the axial direction Z; however, the embodiment is not limited thereto. The plurality of projecting portions may project from the output flange toward the external gear in the axial direction Z. In this case, the external gear has a plurality of first bore portions.

In addition, a use of the electric actuator of the embodiments described above is not limited, and the electric actuator of the embodiments described above may be mounted on any instrument. For example, the electric actuator of the embodiments described above is mounted on a vehicle. In addition, the configurations described in this specification can be appropriately combined within a range in which the configurations are compatible with each other.

What is claimed is:

1. An electric actuator comprising:
a motor that comprises a motor shaft rotating around a central axis, a rotor body fixed to the motor shaft, and a stator facing the rotor body via a gap in a radial direction;
a speed reduction mechanism that is coupled to a region of the motor shaft at one side in an axial direction of the motor shaft;
a case that comprises a case wall covering the stator at the other side in the axial direction of the motor shaft and accommodates the motor and the speed reduction mechanism;
an output shaft which extends in the axial direction of the motor shaft at the one side of the motor shaft in the axial direction and to which rotation of the motor shaft is transmitted via the speed reduction mechanism;
a first bearing that is fixed to the motor shaft and supports the motor shaft rotatably;
a second bearing that is fixed to the motor shaft; and
a bearing holder that is arranged at the case wall and holds the first bearing,
wherein the motor shaft has an eccentric shaft portion having an eccentric axis eccentric with respect to the central axis and treats the eccentric axis as a center,
wherein the speed reduction mechanism has
an external gear that is coupled to the eccentric shaft portion via the second bearing,
an internal gear that surrounds an outer side of the external gear in the radial direction so as to be fixed to the case and intermeshes with the external gear,
an output flange that expands outward in the radial direction from the output shaft and is positioned at one side in the axial direction of the external gear, and
a plurality of projecting portions that project in the axial direction from one of the output flange and the external gear toward the other and are disposed along a circumferential direction,
wherein the other of the output flange and the external gear has a plurality of first bore portions disposed along the circumferential direction,
wherein the first bore portion has an inner diameter larger than an outer diameter of the projecting portion,
wherein the plurality of projecting portions are inserted into the plurality of first bore portions, respectively, and support the external gear via an inner surface of the first bore hole in an oscillatory manner around the central axis,
wherein the bearing holder comprises
a cylindrical circumferential wall that is positioned at an outer side in a radial direction of the first bearing, and
a support wall that supports the first bearing from the other side in the axial direction, and
wherein a position adjustment mechanism configured to be capable of moving the support wall in the axial direction is arranged in the bearing holder.

2. The electric actuator according to claim 1,
wherein the support wall is positioned at an inner side in a radial direction of the circumferential wall, and
wherein the position adjustment mechanism comprises
a female screw portion that is arranged at an inner circumferential surface of the circumferential wall, and
a male screw portion that is arranged at an outer circumferential surface of the support wall and intermeshes with the female screw portion.

3. The electric actuator according to claim 2,
wherein the position adjustment mechanism has a second bore portion that is recessed from a surface of the support wall at the other side in the axial direction toward the one side in the axial direction, and
wherein a plurality of the second bore portions are arranged along the circumferential direction.

4. The electric actuator according to claim 1,
wherein the bearing holder comprises a projecting wall that projects inward in the radial direction from the circumferential wall,
wherein the projecting wall is positioned at the other side of the support wall in the axial direction,
wherein the position adjustment mechanism comprises
a female screw hole that penetrates the projecting wall in the axial direction and has a female screw portion on an inner circumferential surface, and
a screw member that extends in the axial direction and has a male screw portion intermeshing with the female screw portion on an outer circumferential surface, and
wherein an end portion of the screw member at the one side in the axial direction comes into contact with a surface of the support wall at the other side in the axial direction.

5. The electric actuator according to claim 2, further comprising:
a fixer that fixes the female screw portion and the male screw portion.

6. The electric actuator according to claim 1,
wherein the first bearing is a rolling bearing having an inner ring and an outer ring that is positioned at an outer side in a radial direction of the inner ring, and
wherein the support wall has an annular shape having an inner diameter larger than an outer diameter of the inner ring and supports the outer ring from the other side in the axial direction.

* * * * *